US009727826B1

(12) United States Patent
Lindstrom (10) Patent No.: US 9,727,826 B1
(45) Date of Patent: Aug. 8, 2017

(54) USING CONTRARIAN MACHINE LEARNING MODELS TO COMPENSATE FOR SELECTION BIAS

(71) Applicant: Amazon Technologies, Inc., Reno, NV (US)

(72) Inventor: Ian Alan Lindstrom, Duvall, WA (US)

(73) Assignee: Amazon Technologies, Inc., Seattle, WA (US)

(*) Notice: Subject to any disclaimer, the term of this patent is extended or adjusted under 35 U.S.C. 154(b) by 515 days.

(21) Appl. No.: 14/481,345

(22) Filed: Sep. 9, 2014

(51) Int. Cl.
 *G06N 99/00* (2010.01)
 *H04L 29/08* (2006.01)

(52) U.S. Cl.
 CPC .......... *G06N 99/005* (2013.01); *H04L 67/10* (2013.01)

(58) Field of Classification Search
 None
 See application file for complete search history.

(56) References Cited

U.S. PATENT DOCUMENTS

2002/0184134 A1* 12/2002 Olsen ............... G06Q 40/00
 705/37
2012/0066073 A1* 3/2012 Dilip ............... G06Q 30/0269
 705/14.66

OTHER PUBLICATIONS

Huang, Szu-Hao, Shang-Hong Lai, and Shih-Hsien Tai. "A learning-based contrarian trading strategy via a dual-classifier model." ACM Transactions on Intelligent Systems and Technology (TIST) 2.3 (2011): 20.*
Ramirez, Lourdes Pelayo. Developing and Evaluating Methods for Mitigating Sample Selection Bias in Machine Learning. Diss. University of Alberta, 2011.*
Tso, Karen HL, and Lars Schmidt-Thieme. "Empirical analysis of attribute-aware recommender system algorithms using synthetic data." Journal of Computers 1.4 (2006): 18-29.*

* cited by examiner

*Primary Examiner* — Kakali Chaki
*Assistant Examiner* — Daniel Pellett
(74) *Attorney, Agent, or Firm* — Thomas | Horstemeyer, LLP (57) ABSTRACT

Disclosed are various embodiments for using contrarian machine learning models to compensate for selection bias. Both a primary machine learning model and a contrarian machine learning model may be trained for selecting sets of items based at least in part on the same training data. However, the contrarian machine learning model is specially trained to avoid selecting items that are selected by the primary machine learning model. Items selected by the primary model and items selected by the contrarian model are presented to users as recommendations. Both models are updated based at least in part on user selections of items. Ultimately, the use of the contrarian model avoids causing the primary model to degenerate to picking random items due to reinforcement resulting from a bias in favor of selecting items that have been recommended.

20 Claims, 5 Drawing Sheets

FIG. 5 ated in a random, or otherwise lesser quality, recommendation is reinforced by selection feedback. Ultimately, in a worst case scenario, the machine learning model becomes trained to provide recommendations that are no better than random ones.

USING CONTRARIAN MACHINE LEARNING MODELS TO COMPENSATE FOR SELECTION BIAS

BACKGROUND

Recommendations are an increasingly important merchandising tool in electronic commerce. For example, a customer of an online store may be presented with various product recommendations based upon order history, browsing history, demographic information, time of day, and/or a variety of other factors. Purchases by other users and the characteristics of the purchasing users may be employed to create a recommendation model based on the concept that a user is likely to purchase products that have been purchased by similarly situated users. Such an approach is termed collaborative filtering. Although recommendations may be created based upon various input data, all users are different and a high scoring recommendation may miss the mark. In addition, users may decide to purchase non-recommended products.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to improving machine learning models that are affected by an inherent selection bias problem. In a recommendations system driven by a machine learning model, an inherent selection bias exists for a user to select items that are recommended. In other words, users may be more likely to select any items that are brought to their attention via a recommendation regardless of the quality of the recommendation. Thus, randomly selected items without any regard for the characteristics of the user may be more likely to be chosen by the user simply because they are recommended.

When a machine learning approach is utilized in an attempt to improve the recommendation, the user selection feeds back to a machine learning model driving the recommendation. The behavior of the machine learning model that resulted in a random, or otherwise lesser quality, recommendation is reinforced by selection feedback. Ultimately, in a worst case scenario, the machine learning model becomes trained to provide recommendations that are no better than random ones.

Various embodiments of the present disclosure address inherent user selection bias through the use of contrarian machine learning models. In addition to the normal inputs to the standard machine learning model, a contrarian machine learning model also considers the output of the standard machine learning model. A negative weight is applied to this output such that the contrarian machine learning model assumes that the output of the standard machine learning model is incorrect. Consequently, the contrarian machine learning model is guided to recommend items that are different from those recommended by the standard machine learning model, despite that the contrarian machine learning model may also consider the same inputs. When recommendations are presented to a user, some recommendations may be generated via the standard machine learning model, while other recommendations may be generated by the contrarian machine learning model. The contrarian machine learning model may be judged not merely on its own merits, but on how it affects the results of the standard machine learning model.

Figure 1:
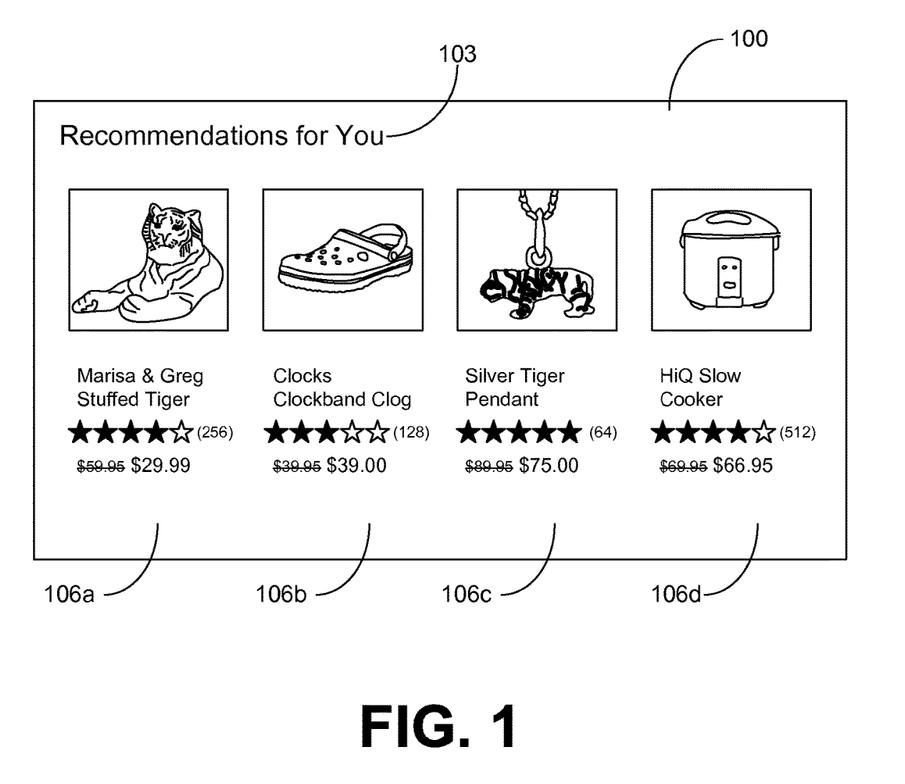
FIG. 1 is a pictorial diagram of an example user interface according to various embodiments of the present disclosure.

A non-limiting example will now be described with reference to FIG. 1. FIG. 1 shows an example of a user interface 100 that is configured to present various product recommendations to a user. The title 103 of the user interface 100 is "Recommendations for You." It is noted that the title 103 that is displayed may affect potential user selection bias. That is to say, when users are under the impression that certain products are specifically recommended for them, the users may be more likely to select such products, even if the products are chosen randomly. Thus, in some instances, a title 103 may be omitted, or the wording of the title 103 may be carefully crafted to be as neutral as possible in order to reduce selection bias.

FIG. 1 features four products 106. Product 106a is a "Marisa & Greg Stuffed Tiger," product 106b is a "Clocks Clockband Clog," product 106c is a "Silver Tiger Pendant," and product 106d is a "HiQ Slow Cooker." Although four products 106 are featured in this user interface 100, it is understood that various user interfaces 100 may feature more or fewer products 106 depending on the available display space and/or on other factors. In some cases, a user interface 100 may have a scrolling panel to show or hide additional products 106.

In this instance, products 106a, 106b, and 106c are selected by a recommendations engine driven by a standard machine learning model. However, product 106d is selected by a recommendations engine driven by a contrarian machine learning model. In various embodiments, the proportion of products 106 generated by the standard machine learning model versus the contrarian machine learning model may be configurable.

In order to overcome a user selection bias, the contrarian machine learning model is configured to avoid selecting the products 106 that are selected by the standard machine learning model, namely products 106a, 106b, and 106c. As a result, the product 106d ("HiQ Slow Cooker") is surfaced to the user, which may be of more interest to the user than the other products 106a, 106b, and 106c. If the user selects the product 106d (e.g., for viewing a detail page or for purchase), that selection may feed back into both the standard machine learning model and into the contrarian machine learning model, thereby preventing the standard machine learning model from being reinforced for making random selections and being the only model presenting recommendations.

In the following discussion, a general description of the system and its components is provided, followed by a discussion of the operation of the same.

Figure 2:
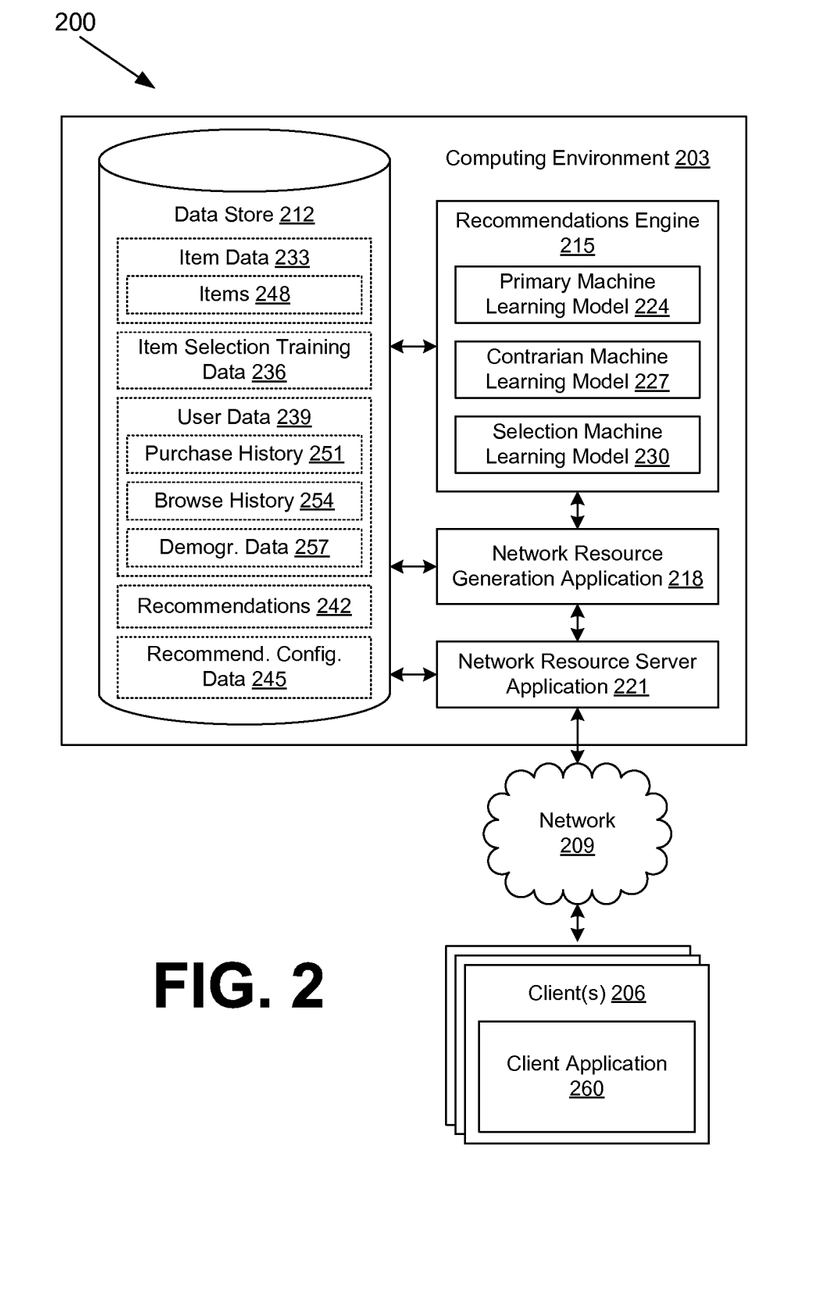
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more clients 206, which are in data communication with each other via a network 209. The network 209 includes, for example, the Internet, intranets, extranets, wide area networks (WANs), local area networks (LANs), wired networks, wireless networks, cable networks, satellite networks, other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a recommendations engine 215, a network resource generation application 218, a network resource server application 221, and other applications, services, processes, systems, engines, or functionality not discussed in detail herein. The recommendations engine 215 is executed to provide a set of items to be recommended to one or more users. To this end, the recommendations engine 215 may include multiple competing machine learning models, including a primary machine learning model 224 and a contrarian machine learning model 227. The primary machine learning model 224 may employ a conventional approach toward selecting items to be recommended based upon training data that describes past selections. As a user selects (or refrains from selecting) recommended items, the primary machine learning model 224 is updated with the goal of making more effective recommendations in the future, where the user is more likely to select and/or purchase the items that are recommended. In one embodiment, user selections of recommended items that result in purchases of the recommended items may be more heavily weighted in updating the model.

The contrarian machine learning model 227 may be provided with the same inputs as the primary machine learning model 224. However, in addition to these inputs, the contrarian machine learning model 227 is configured to take a contrarian view on the predictions of the primary machine learning model 224. That is to say, the contrarian machine learning model 227 assumes that the recommendations of the primary machine learning model 224 are not good recommendations. To this end, the recommendations of the primary machine learning model 224 feed back into the contrarian machine learning model 227 together with a negative weight. For example, items recommended most strongly by the primary machine learning model 224 may thus receive the greatest negative weighting. Conversely, items that are weakly recommended by the primary machine learning model 224 may receive a lesser negative weighting.

Further, in some embodiments, the contrarian machine learning model 227 may receive fewer or different inputs than the primary machine learning model 224. Specifically, in some scenarios, items 248 may be associated with weights driven by arbitrary considerations, such as business reasons, sponsored rankings, and so on. For example, it may be preferred for the primary machine learning model 224 to recommend certain sponsored results. When providing inputs to the contrarian machine learning model 227, such arbitrary weights of items 248 may be removed to avoid a bias in the results.

The contrarian machine learning model 227 is still configured to predict items that a user will be interested in, like the primary machine learning model 224, but the contrarian machine learning model 227 is configured to surface items that would not be recommended by the primary machine learning model 224. Consequently, if the primary machine learning model 224 were to degenerate into a random selection to a user selection bias, the contrarian machine learning model 227 would still work to surface items in which the user is likely to be interested.

By contrast, if the primary machine learning model 224 is correctly trained, the contrarian machine learning model 227 may appear to pick randomized selections. Given this behavior, it may be preferable for the recommendations engine 215 to use more recommendations from the primary machine learning model 224 than from the contrarian machine learning model 227. Such recommendations may be presented side-by-side in an indistinguishable manner. The proportion of recommendations from the primary machine learning model 224 versus the contrarian machine learning model 227 may be configurable. In some embodiments, a selection machine learning model 230 may be employed in order to select results from either the primary machine learning model 224 or the contrarian machine learning model 227. Thus, if the primary machine learning model 224 is correctly functioning, more results from the primary machine learning model 224 will be shown. If the contrarian machine learning model 227 is proving productive, more of its results may be shown.

The primary machine learning model 224, the contrarian machine learning model 227, and the selection machine learning model 230 may employ various types of machine learning approaches. Such approaches may include decision trees, linear classifiers, quadratic classifiers, k-means clustering, boosting, neural networks, Bayesian networks, and/or other approaches. In one embodiment, the primary machine learning model 224 and the contrarian machine learning model 227 may use the same underlying machine learning approaches, while in another embodiment, the primary machine learning model 224 and the contrarian machine learning model 227 may use different underlying machine learning approaches.

The network resource generation application 218 may be configured to generate network pages, such as web pages, or other forms of network content to be served up over the network 209 to clients 206. The network resource generation application 218 may invoke the recommendations engine 215 to determine a set of recommended items, which may include those recommended by the primary machine learning model 224 and/or the contrarian machine learning model 227. Such recommended items may be associated with respective scores and/or rankings, and highly ranked or scored items may be presented to users first before lowly ranked or scored items. The network resource generation application 218 may be configured to generate a sequence of network pages, where a subset of the recommended items is shown on each page. In some embodiments, the network resource generation application 218 functions as part of an electronic commerce system that makes items available for purchase, rental, lease, download, or other forms of consumption.

The network resource server application 221 is executed to serve up network resources, including those generated by the network resource generation application 218, to clients 206 via the network 209. The network resources may include network pages and/or content to be provided to mobile applications or other applications executed by the clients 206. In various embodiments, the network resource server application 221 may serve up data via hypertext transfer protocol (HTTP), simple object access protocol (SOAP), representational state transfer (REST), and/or other protocols. In various embodiments, the network resource server application 221 may comprise a commercially available HTTP server such as Apache® HTTP server, Microsoft® Internet Information Services, Apache® Tomcat®, and/or other servers. In some embodiments, the recommendations may be delivered to clients 206 via email, text message, instant message, or other forms of communication via the network 209.

The data stored in the data store 212 includes, for example, item data 233, item selection training data 236, user data 239, recommendations 242, recommendations configuration data 245, and potentially other data. The item data 233 may include a variety of data regarding items 248, which may correspond to products, goods, services, downloads, media items, and/or other items that may be selected for consumption. In one embodiment, the items 248 may correspond to those offered in an electronic catalog of one or more online marketplaces. The item data 233 may include titles, descriptions, prices, ratings, reviews, weights, restrictions, categories, images, videos, audio, and/or other information regarding items 248.

The item selection training data 236 includes various inputs used in training the primary machine learning model 224 and the contrarian machine learning model 227 of the recommendations engine 215. These inputs may relate to previous item selections by multiple users. Such selections may include selections for purchase; for adding to a shopping cart, a wish list, or another form of list; for browsing and viewing additional detailed information about the item 248; and/or other selections. The inputs may also include characteristics about items 248 and users to enable determination of similarity. Accordingly, after training, the primary machine learning model 224 and/or the contrarian machine learning model 227 are able to predict selections based upon past behavior of similarly situated users in relation to similar items 248.

The user data 239 includes a variety of information about a plurality of users. Such information may include purchase history 251, browse history 254, demographic data 257, and/or other data. The purchase history 251 may indicate items 248 that a particular user has ordered in the past. The browse history 254 may indicate items 248 about which a particular user has requested more detailed information or added to a list. The demographic data 257 may indicate user age, geographic location, gender, occupation, interests, and/or other information that characterizes a given user. The user data 239 may be employed in creating the item selection training data 236 and in training the primary machine learning model 224 and the contrarian machine learning model 227.

The recommendations 242 include the results of the primary machine learning model 224 and the contrarian machine learning model 227. Each of the recommendations 242 may be associated with respective scores or rankings based upon how likely the corresponding recommendation 242 is to be selected by the user. The recommendations configuration data 245 may include various parameters that configure the operation of the recommendations engine 215. For example, the recommendations configuration data 245 may specify a certain proportion of recommendations 242 that are to come from the primary machine learning model 224 as opposed to the contrarian machine learning model 227. In many cases, it will be desired to have more recommendations 242 come from the primary machine learning model 224 than the contrarian machine learning model 227.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display such as, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 206 may be configured to execute various applications such as a client application 260 and/or other applications. The client application 260 may be executed in a client 206, for example, to access network content served up by the computing environment 203 and/or other servers, thereby rendering a user interface 100 (FIG. 1) on the display. To this end, the client application 260 may comprise, for example, a browser or a dedicated application, etc., and the user interface 100 may comprise a network page or an application screen, etc. The client 206 may be configured to execute applications beyond the client application 260 such as, for example, email applications, social networking applications, word processors, spreadsheets, and/or other applications.

Next, a general description of the operation of the various components of the networked environment 200 is provided. To begin, the user data 239 is obtained in the data store 212 via the interaction of users with electronic commerce systems, social networking systems, and/or other systems. As users purchase items 248, the purchase history 251 is populated along with information about the users' purchases. For example, if a user viewed a first item 248 before actually purchasing a second item 248, that information may be recorded in the purchase history 251. As users browse the offerings of an electronic catalog and/or other network sites, the browse history 254 is populated. In addition, the browse history 254 may record click-trails and/or other information that may reveal similarities between items 248. The demographic data 257 is populated as users register with the system, place orders, provide information implicitly (e.g., geolocation of the user's internet protocol (IP) address), and/or perform other actions.

From the various user data 239, the item selection training data 236 may be generated. Although the examples herein refer to item selections by users, it is understood that the principles of the present disclosure may apply to item selections performed by automated systems in some cases. The item selection training data 236 is then used to train the primary machine learning model 224 and the contrarian machine learning model 227, which are both configured to provide subsets of the items 248 as recommendations 242.

The current context surrounding a network resource request (e.g., current user, current item 248 being browsed, etc.) may be provided to the recommendations engine 215. The recommendations engine 215 may then invoke the primary machine learning model 224 and the contrarian machine learning model 227 given the current context in order to determine respective sets of items 248 to be recommended. The recommendations engine 215 may select items 248 from each of the respective sets according to a proportion defined in the recommendations configuration data 245. This proportion may be generated through the operation of the selection machine learning model 230.

A client application 260 executed by a client 206 may request a network resource from the network resource server application 221 via the network 209. This network resource may comprise a network page, data for a dedicated application, or other content. The network resource server application 221 then obtains the network resource from the network resource generation application 218. The network resource may be dynamically generated by the network resource generation application 218 or may be retrieved from a cache in the data store 212. In some cases, page generation may occur partially or completely in the client 206.

Within the network resource may be a set of recommendations 242 generated by the recommendations engine 215 given the context of the resource request. For example, a panel within a web page may include several titles, images, and/or descriptions of items 248 that have been recommended. The recommendations 242 may be organized in a grid, a horizontal list, a vertical list, or another arrangement. The recommendations 242 may be presented in a predefined order according to ranking or may be presented in a randomized order. In one embodiment, the recommendations 242 may be presented in a scrolling viewport. The number of recommendations 242 shown may depend upon a current display area of the client application 260. For example, resizing a window user interface of the client application 260 may allow for a different number of recommendations 242 to be presented.

As discussed, the recommendations 242 may include one or more items 248 predicted by the primary machine learning model 224 and one or more items 248 predicted by the contrarian machine learning model 227. In some cases, a sequence of network resources may be requested and presented by the client application 260. For example, a search engine may serve up listings of search results across multiple pages. Each page in the sequence may include recommendations 242, with the highest ranked recommendations 242 being on the first page and successively lower ranked recommendations 242 being on subsequent pages. In one embodiment, a greater number of recommendations 242 from the primary machine learning model 224 may be included on earlier pages in the sequence, with the proportion being altered for later pages in the sequence to increase the number of recommendations 242 from the contrarian machine learning model 227 that are presented.

A user may decide to select or not select items 248 that have been recommended. A user may "select," or express an interest in an item 248, by clicking a link for a detail page of the item 248, hovering a mouse cursor about a description or image of the item 248, selecting a "quick view" function for additional information, adding the item 248 to a shopping cart or other list, purchasing the item 248, or performing other actions that indicate a particular interest in the item 248. Such selection actions may be reported back to the network resource server application 221. In some cases, it may be determined that the user has looked at but not expressed an interest in an item 248. Such a decision not to select may also be reported back to the network resource server application 221. In some cases, a user may not actually view the item 248 because, for example, the recommendations 242 are "below the fold," or otherwise not rendered upon the display of the client 206. Inaction of the user in such a case may also be reported back to the network resource server application 221, but may be considered differently when feeding back into the machine learning models.

When selections (or non-selections) are received by the network resource server application 221, they are provided to the primary machine learning model 224 and to the contrarian machine learning model 227 in order to improve future recommendations 242. Specifically, selections by a user may be considered relatively good recommendations 242, thereby reinforcing the behavior of the machine learning model that resulted in generating the recommendations 242. In addition, different expressions of user interest may be given different weightings. For example, a purchase of an item 248 may be weighted more strongly than merely viewing additional details about an item 248. A decision not to select an item 248 that was recommended may result in the corresponding recommendation 242 being considered a relatively poor recommendation 242, and the machine learning model may then be configured to avoid making similar recommendations 242.

Figure 3:
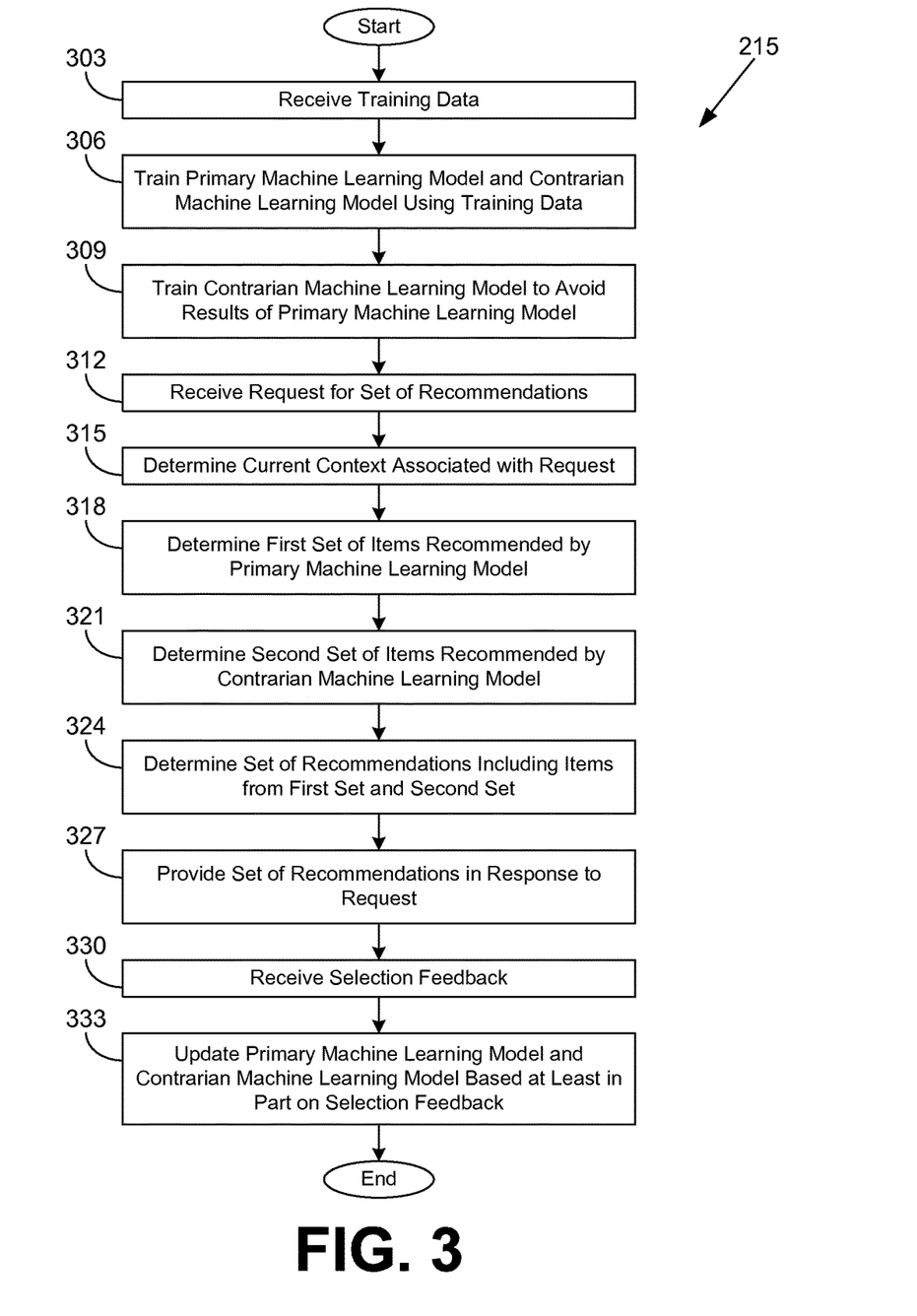
FIG. 3 is a flowchart illustrating one example of functionality implemented as portions of a recommendations engine executed in a computing environment in the networked environment of FIG. 2 according to various embodiments of the present disclosure.

Referring next to FIG. 3, shown is a flowchart that provides one example of the operation of a portion of the recommendations engine 215 according to various embodiments. It is understood that the flowchart of FIG. 3 provides merely an example of the many different types of functional arrangements that may be employed to implement the operation of the portion of the recommendations engine 215 as described herein. As an alternative, the flowchart of FIG. 3 may be viewed as depicting an example of elements of a method implemented in the computing environment 203 (FIG. 2) according to one or more embodiments.

Beginning with box 303, the recommendations engine 215 receives training data, such as the item selection training data 236 (FIG. 2) from the data store 212 (FIG. 2). The training data may represent historical item selections from a plurality of different users. The item selections may be associated with various item data 233 (FIG. 2) and/or user data 239 (FIG. 2), including demographic data 257. In box 306, the recommendations engine 215 trains both the primary machine learning model 224 (FIG. 2) and the contrarian machine learning model 227 (FIG. 2) using the training data. In one embodiment, the training data provided to train the contrarian machine learning model 227 may be filtered to remove arbitrary weights associated with items 248 (e.g., preferences given to sponsored results). In box 309, the recommendations engine 215 trains the contrarian machine learning model 227 further using the results of the primary machine learning model 224 such that the contrarian machine learning model 227 avoids producing those results.

In box 312, the recommendations engine 215 receives a request for a set of recommendations 242 (FIG. 2). In box 315, the recommendations engine 215 determines a current context associated with the request. The context may include the user associated with the request, an item 248 being featured in a network page associated with the request, an item 248 that has just been purchased or added to a shopping cart, and so on.

In box 318, the recommendations engine 215 determines a first set of items 248 recommended by the primary machine learning model 224 given the current context. In box 321, the recommendations engine 215 determines a second set of items 248 recommended by the contrarian machine learning model 227 given the current context. The first set of items 248 may also be an input to the contrarian machine learning model 227 such that the contrarian machine learning model 227 applies a negative weight to the first set of items 248.

In box 324, the recommendations engine 215 determines a set of recommendations 242 including one or more items 248 from the first set and one or more items 248 from the second set. In box 327, the recommendations engine 215 provides the set of recommendations 242 to the requesting entity in response to the request. In some cases, a subset of these recommendations 242 may be initially provided, with other subsets being provided upon subsequent requests.

In box 330, the recommendations engine 215 receives selection feedback from users via the clients 206 (FIG. 2). The users may choose to select, not to select, or may not see the recommendations 242 provided to them. Based at least in part on this selection feedback, in box 333, the recommendations engine 215 updates the primary machine learning model 224 and the contrarian machine learning model 227. Additional selections may be received and the primary machine learning model 224 and the contrarian machine learning model 227 may be updated repeatedly, thereby refining their operation. Thereafter, the operation of the portion of the recommendations engine 215 ends.

Figure 4:
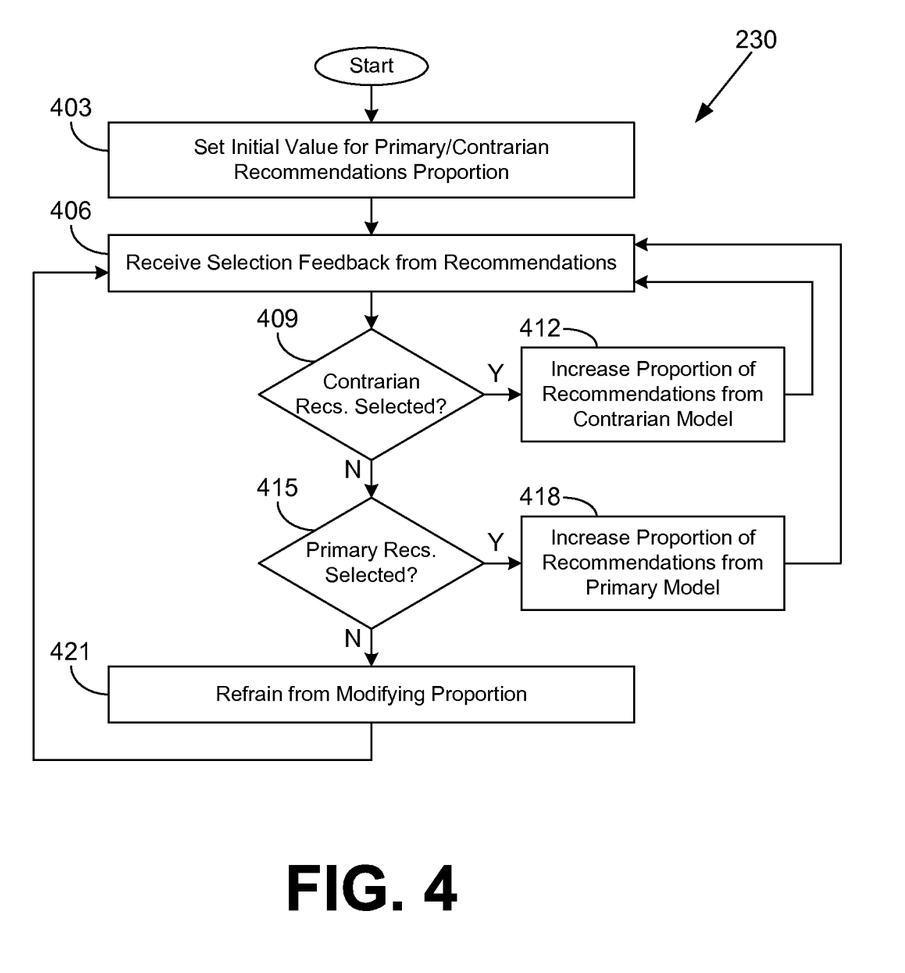
FIG. 4 is a flowchart illustrating one example of functionality implemented as portions of a selection machine learning model executed in a computing environment in the networked environment of FIG. 2 according to various embodiments of the present disclosure.

Turning now to FIG. 4, shown is a flowchart that provides one example of the operation of a portion of the selection machine learning model 230 according to various embodiments. It is understood that the flowchart of FIG. 4 provides merely an example of the many different types of functional arrangements that may be employed to implement the operation of the portion of the selection machine learning model 230 as described herein. As an alternative, the flowchart of FIG. 4 may be viewed as depicting an example of elements of a method implemented in the computing environment 203 (FIG. 2) according to one or more embodiments.

Beginning with box 403, the selection machine learning model 230 sets an initial value for a proportion of a set of recommendations 242 (FIG. 2) to be taken from the recommendations 242 generated by the primary machine learning model 224 (FIG. 2) and from the recommendations 242 generated by the contrarian machine learning model 227 (FIG. 2). In box 406, the selection machine learning model 230 receives selection feedback from a set of recommendations 242.

In box 409, the selection machine learning model 230 determines whether more recommendations 242 from the contrarian machine learning model 227, as opposed to recommendations 242 from the primary machine learning model 224, have been selected by users. A comparison to a threshold may be utilized in making this evaluation. If so, in box 412, the selection machine learning model 230 increases the proportion of recommendations 242 to be used from the contrarian machine learning model 227. In some cases, there may be a predefined minimum proportion of recommendations 242 from the primary machine learning model 224, which may impede increasing the proportion of recommendations 242 from the contrarian machine learning model 227. The minimum proportion of recommendations 242 from the primary machine learning model 224 may be established to avoid a bias. The selection machine learning model 230 then returns to box 406.

If more recommendations 242 from the contrarian machine learning model 227, as opposed to recommendations 242 from the primary machine learning model 224, have not been selected, the selection machine learning model 230 continues to box 415. In box 415, the selection machine learning model 230 determines whether more recommendations 242 from the primary machine learning model 224, as opposed to recommendations 242 from the contrarian machine learning model 227, have been selected by users. A comparison to a threshold may be utilized in making this evaluation. If so, in box 418, the selection machine learning model 230 increases the proportion of recommendations 242 to be used from the primary machine learning model 224. In some cases, there may be a predefined minimum proportion of recommendations 242 from the contrarian machine learning model 227, which may impede increasing the proportion of recommendations 242 from the primary machine learning model 224. The minimum proportion of recommendations 242 from the contrarian machine learning model 227 may be established to avoid a bias. The selection machine learning model 230 then returns to box 406.

If more recommendations 242 from the primary machine learning model 224, as opposed to recommendations 242 from the contrarian machine learning model 227, have not been selected, the selection machine learning model 230 continues to box 421. In box 421, the selection machine learning model 230 refrains from modifying the proportion. Subsequently, the selection machine learning model 230 returns to box 406 to receive additional selection feedback. In this way, the proportion of recommendations 242 from the primary machine learning model 224 or the contrarian machine learning model 227 can change dynamically, reflecting the current effectiveness of either model.

Figure 5:
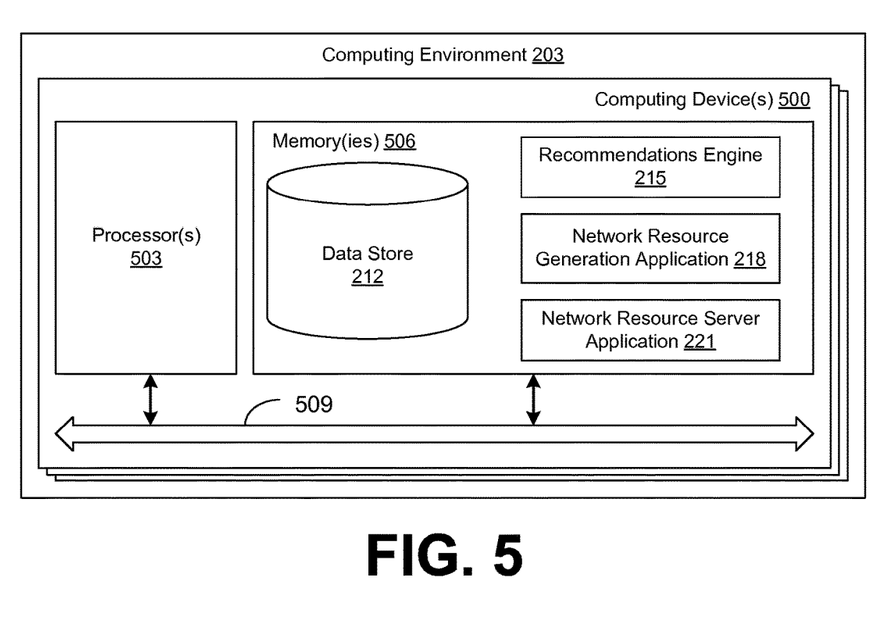
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the recommendations engine 215, the network resource generation application 218, the network resource server application 221, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the recommendations engine 215, the network resource generation application 218, the network resource server application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the recommendations engine 215 and the selection machine learning model 230 (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the recommendations engine 215, the network resource generation application 218, and the network resource server application 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the recommendations engine 215, the network resource generation application 218, and the network resource server application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to perform a method comprising:
    obtaining, by the at least one computing device, training data that includes a plurality of selections from a plurality of products in an electronic catalog by a plurality of users;
    training, by the at least one computing device, a primary machine learning model using the training data;
    training, by the at least one computing device, a contrarian machine learning model using the training data and a result of the primary machine learning model, wherein the contrarian machine learning model is configured to apply a negative weight to the result of the primary machine learning model;
    generating, by the at least one computing device, a first set of products recommended for a particular user by the primary machine learning model;
    generating, by the at least one computing device, a second set of products recommended for the particular user by the contrarian machine learning model;
    encoding, by the at least one computing device, a user interface for rendering that includes a set of recommended products, the set of recommended products including at least one product from the first set and at least one product from the second set;
    obtaining, by the at least one computing device, a user selection of a particular product from the set of recommended products; and
    updating, by the at least one computing device, the primary machine learning model and the contrarian machine learning model based at least in part on the user selection.

2. The non-transitory computer-readable medium of claim 1, wherein the primary machine learning model and the contrarian machine learning model are both configured to recommend products for the particular user based at least in part on at least one of: a browse history of the particular user or an order history of the particular user.

3. The non-transitory computer-readable medium of claim 1, wherein the method further comprises determining, by the at least one computing device, a proportion of products to select from the first set and the second set for the set of recommended products.

4. A system, comprising:
    at least one computing device; and
    at least one application executed in the at least one computing device, the at least one application being configured to cause the at least one computing device to perform a method comprising:
        implementing, by the at least one computing device, a first machine learning model based at least in part on training data;
        implementing, by the at least one computing device, a second machine learning model based at least in part on the training data and a result of the first machine learning model, the second machine learning model being configured to apply a negative weight to the result of the first machine learning model;
        generating, by the at least one computing device, a first subset of a plurality of items using the first machine learning model; and
        generating, by the at least one computing device, a second subset of the plurality of items using the second machine learning model.

5. The system of claim 4, wherein the method further comprises generating, by the at least one computing device, a user interface that presents a third subset of the plurality of items for possible user selection, the third subset including at least one item from the first subset and at least one item from the second subset.

6. The system of claim 5, wherein the method further comprises:
    receiving, by the at least one computing device, a user selection of a particular item from the third subset; and
    updating, by the at least one computing device, the first machine learning model and the second machine learning model based at least in part on the user selection.

7. The system of claim 6, wherein the user selection corresponds to at least one of: a purchase of the particular item, an addition of the particular item to a list of items, or a viewing of detailed information regarding the particular item.

8. The system of claim 5, wherein the third subset includes an unequal proportion of items from the first subset and the second subset.

9. The system of claim 8, wherein the third subset includes more items from the first subset than from the second subset.

10. The system of claim 8, wherein the method further comprises determining, by the at least one computing device, the unequal proportion of items based at least in part on a third machine learning model.

11. The system of claim 4, wherein the plurality of items correspond to a plurality of products in an electronic catalog.

12. The system of claim 4, wherein the training data includes a plurality of selections from the plurality of items by a plurality of users.

13. A method, comprising:
    training, by at least one computing device, a first machine learning model using training data that includes a plurality of selections from a plurality of items;
    training, by the at least one computing device, a second machine learning model using the training data;
    generating, by the at least one computing device, a first subset of the plurality of items using the first machine learning model; and
    generating, by the at least one computing device, a second subset of the plurality of items using the second machine learning model based at least in part on the first subset of the plurality of items, wherein the second machine learning model is configured to refrain from selecting items from the first subset of the plurality of items.

14. The method of claim 13, further comprising generating, by the at least one computing device, a recommended set of items that includes at least one item from the first subset and at least one item from the second subset.

15. The method of claim 14, further comprising:
    receiving, by the at least one computing device, a user selection from the recommended set of items; and
    updating, by the at least one computing device, the first machine learning model and the second machine learning model based at least in part on the user selection.

16. The method of claim 14, further comprising generating, by the at least one computing device, a user interface configured to present the recommended set of items, wherein the user interface is configured to present items from the first subset and the second subset indistinguishably.

17. The method of claim 16, further comprising randomizing, by the at least one computing device, respective relative positions of the items from the first subset and the second subset within the user interface.

18. The method of claim 14, further comprising filtering, by the at least one computing device, the training data provided to the second machine learning model to remove arbitrary weights associated with the plurality of items.

19. The method of claim 13, wherein individual items from the first subset and the second subset are associated with a respective ranking.

20. The method of claim 13, wherein the first machine learning model and the second machine learning model employ different machine learning approaches.

* * * * *